(No Model.)

G. H. WARDE.
UNDERGROUND CONDUIT.

No. 413,215. Patented Oct. 22, 1889.

Witnesses
Geo. W. Breck
Edward Thorpe

Inventor
George H. Warde
By his Attorneys
Baldwin, Davidson & Wight

UNITED STATES PATENT OFFICE.

GEORGE HENRY WARDE, OF NEW YORK, N. Y., ASSIGNOR TO WILLIAM HAMPDEN JOHNSTONE, OF PHILADELPHIA, PENNSYLVANIA.

UNDERGROUND CONDUIT.

SPECIFICATION forming part of Letters Patent No. 413,215, dated October 22, 1889.

Application filed May 9, 1889. Serial No. 310,104. (No model.)

*To all whom it may concern:*

Be it known that I, GEORGE HENRY WARDE, a citizen of the United States, residing in New York, county of New York, State of New York, have invented certain new and useful Improvements in Test-Boxes for Underground-Conduit Systems, of which the following is a specification.

The object of my invention is to provide a hermetically-sealed test-box which will exclude all moisture and afford convenient access to the wires of the cable entering it.

To this end the invention consists in certain improvements in the box itself, by which any possibility of moisture effecting an entrance is prevented, and also in an improved joint through which the cable is carried to the interior of the box.

Figure 1:
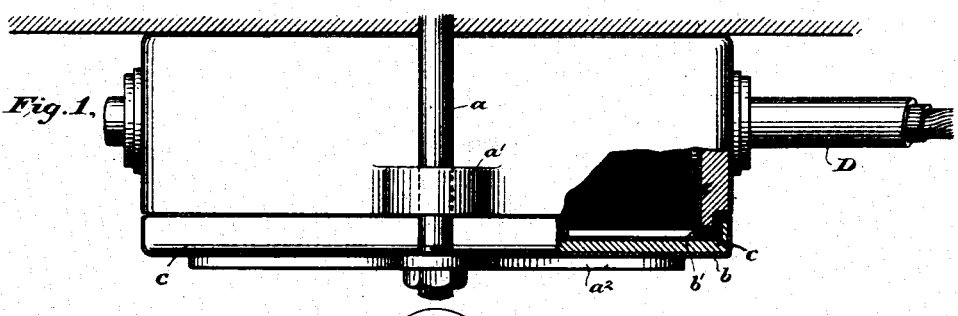
Figure 2:
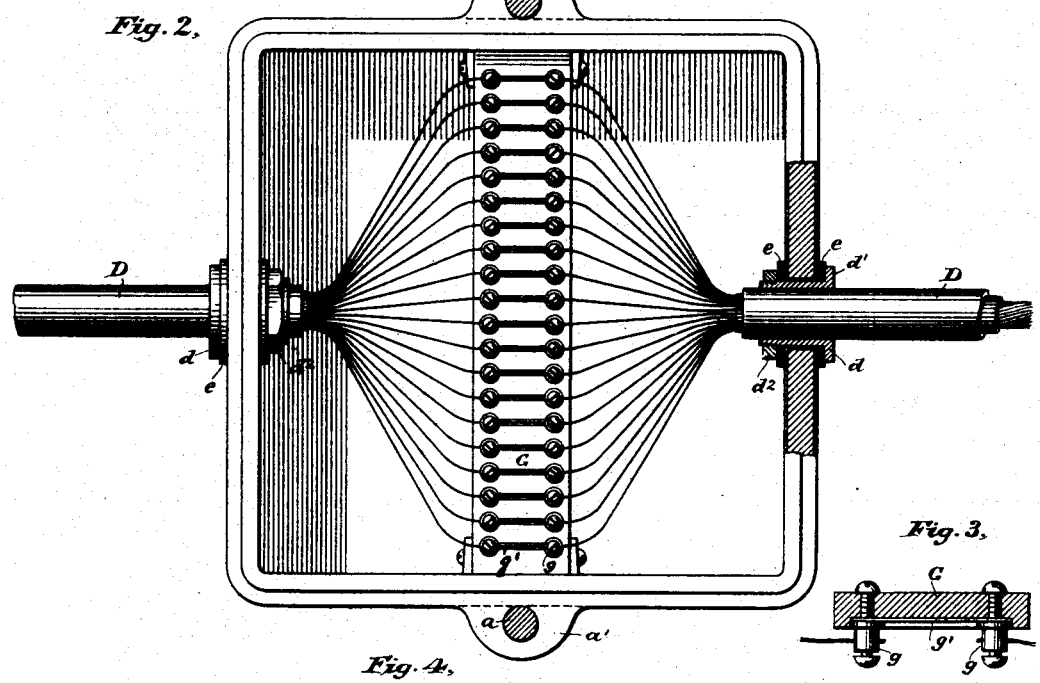
Figure 3:
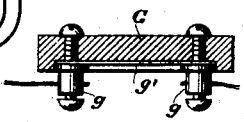
Figure 4:
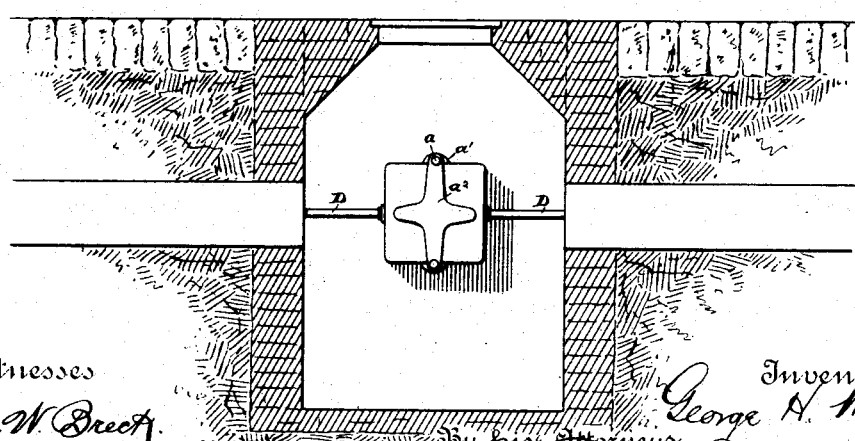

In the accompanying drawings, Figure 1 is a top view illustrating the test-box with one corner broken away; Fig. 2, a front elevation with the cover removed, with one of the joints or glands where the cable enters the box in section; Fig. 3, a detail view in cross-section of the glass post or block within the box to which the terminals of the wire from the opposite ends of the cable are brought, and Fig. 4 a sectional view illustrating a test-box hung in the man-hole of a subway system.

The box may be hung upon iron bolts $a$, projecting from the walls of the man-hole and passing through ears or lugs $a'$ on the upper and lower faces of the box. These rods are screw-threaded upon their ends for the reception of clamp-nuts and pass through a clamp $a^2$, which clamps the door or cover $b$ in place.

Between the cover and the edges of the box a rubber gasket $b'$ is interposed, so that a perfectly-close joint is made, excluding air and moisture.

The box is preferably of rectangular shape, relatively shallow, and is supported vertically, so that when the cover $b$, which forms the entire side of the box, is removed its interior is fully exposed.

In order to prevent completely any entrance of air or moisture within the box, I enamel the interior both of the box and cover and the edges of the box against which the washer bears. The surfaces of contact between the box, washer, and cover will not, therefore, become oxidized, and the preservation of the washer and the continued perfection of the joint are attained. This will ordinarily, no doubt, be sufficient to keep the interior of the box perfectly dry; but as ordinary cast-iron is more or less apt to have imperfections which render it somewhat porous, and as moisture might penetrate it and tend to produce oxidation upon the inner face of the box, causing the destruction or scaling off of the enamel, I also prefer to enamel both the exterior of the box and of the cover.

In the drawings, $c$ represents the enameling. Any air-tight or water-proof enameling may be used. I consider the vitreous enamel with which kitchen utensils are covered, and known as "granolithic" or "granite," as suitable for the purpose. It is very indestructible, and forms a close union with the iron surface to which it is applied.

Cables are introduced through the sides of the boxes in the following manner: D represents an ordinary armored or lead-covered cable. A collar $d$, of brass or other suitable alloy or metal, is slipped over the cable and soldered to it. Upon the exterior of the box the collar has a flange $d'$, and upon its inner end it is screw-threaded for the reception of the nut $d^2$. The collar having been soldered to the cable, the two are passed through the aperture in the side of the box, within which the collar closely fits. Washers $e$ are interposed between the flange $d'$ and the exterior face of the box and between the clamp-nut $d^2$ and the interior face of the box. This gives a perfectly-tight joint, entirely air and moisture proof, and, as before remarked, the enameling prevents the oxidation of the surfaces and the deterioration of the joint. Within the box is arranged a vertical post or block G, of insulating material, preferably glass, in which are secured two vertical parallel rows of binding-posts $g$, opposite binding-posts being connected by cross conducting-strips $g'$. The wires from the opposite ends of the cable are carried to the binding-posts, as indicated, and when the connections are all made the circuit of each wire will be complete, and, the binding-posts being numbered or otherwise designated, any particular wire may be selected for testing or for any other purpose. All the wires of a certain class would be carried through one or more test-boxes devoted exclusively to their use. Of course the dimensions of the boxes may be increased and any required number of cables brought in through their sides in the manner indicated.

I claim as my invention—

1. The combination of the test-box, an armored or lead-covered cable extending through an opening in the box, a collar $d$, secured to the cable and fitting said opening and having a flange $d'$ exterior to the box, and clamping devices on the collar within the box, substantially as set forth.

2. The combination, with the sides or walls of the box having an aperture for the passage of the armored or lead-covered cable, of the flanged collar secured to the cable, the washers $e$, and the clamping devices, as $d^2$, substantially as set forth.

3. The combination of the enameled wall of the test-box, the cable extending through the enameled wall, the flanged collar secured to the cable and passing through the wall of the box, the clamping-nut on the end of the collar, and washers interposed between the nut, the flanged collar, and the wall of the box.

4. The combination, substantially as set forth, in a subway man-hole, of the laterally-projecting bolts $a$, a vertically-hung test-box into which cables run, having suspending ears or lugs through which said bolts pass, the test-box cover, and clamping devices, as a clamp $a^2$, and nuts on the end of the bolts to secure the vertical cover of the test-box.

In testimony whereof I have hereunto subscribed my name.

GEORGE HENRY WARDE.

Witnesses:
WILLIAM G. DAVIS,
EDWARD C. DAVIDSON.